United States Patent
Srnka et al.

(10) Patent No.: US 8,078,439 B2
(45) Date of Patent: *Dec. 13, 2011

(54) METHOD OF IMAGING SUBSURFACE FORMATIONS USING A VIRTUAL SOURCE ARRAY

(75) Inventors: Leonard J. Srnka, Houston, TX (US); James J. Carazzone, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/796,374

(22) Filed: Jun. 8, 2010

(65) Prior Publication Data

US 2010/0250211 A1 Sep. 30, 2010

Related U.S. Application Data

(63) Continuation of application No. 10/228,453, filed on Aug. 27, 2002, now Pat. No. 7,769,572.

(60) Provisional application No. 60/318,082, filed on Sep. 7, 2001.

(51) Int. Cl.
G06G 7/56 (2006.01)
G06G 7/48 (2006.01)

(52) U.S. Cl. .................................. 703/5; 703/10; 703/2

(58) Field of Classification Search .................. 703/2, 5, 703/10

See application file for complete search history.

(56) References Cited

U.S. PATENT DOCUMENTS

| | | | |
|---|---|---|---|
| 3,727,231 A | 4/1973 | Galloway et al. | |
| 4,247,821 A | 1/1981 | Buselli et al. | |
| 4,446,434 A | 5/1984 | Sternberg et al. | |
| 4,535,293 A | 8/1985 | Rocroi et al. | |
| 4,617,518 A | 10/1986 | Srnka | |
| 4,633,182 A | 12/1986 | Dzwinel | |
| 4,875,015 A | 10/1989 | Ward | |
| 5,563,513 A | 10/1996 | Tasci et al. | |

FOREIGN PATENT DOCUMENTS

| | | |
|---|---|---|
| RU | 2084929 | 7/1997 |
| WO | WO 98/28638 | 7/1998 |
| WO | WO 00/13046 | 3/2000 |

OTHER PUBLICATIONS

Bibby, "Analysis of Multiple-Source Bipole-Quadripole Resistivity Surveys Using the Apparent Resistivity Tensor", Geophysics, vol. 51, No. 4 (Apr. 1986); p. 972-983, 13 Figs.*

Risk "Tests for Resistivity Boundary Changes at Ohaaki New Zealand", Jan. 18-20, 1994.*

(Continued)

*Primary Examiner* — Saif Alhija

(74) *Attorney, Agent, or Firm* — ExxonMobil Upstream Research Co. Law Dept.

(57) ABSTRACT

This invention relates generally to a method of simulating the signal of an electromagnetic source using one or more dipole sources. In the method a dipole source is located at an excitation location corresponding to a segment of the electromagnetic source to be simulated. The dipole source is activated, and an electromagnetic signal recorded at one or more receiver locations. This process is repeated for additional excitation locations corresponding to additional segments of the electromagnetic source. The data from the sequence of dipole source excitation locations is processed to determine the simulated signal of the electromagnetic source.

19 Claims, 11 Drawing Sheets

OTHER PUBLICATIONS

Bing et al. "Explicit Expressions and Numerical Calculations for the Frechet and second derivatives in 2.5D Helmholtz equation inversion", Jul. 1999.*
Caldwell et al. "Visualization of Tensor Time Domain Electromagnetic Data", 17$^{th}$ NZ Geothermal Workshop 1995.*
Caldwell et al. "Instantaneous apparent resistivity tensor: a visualization scheme for LOTEM electric field measurements".*
Brunner et al. "Investigation of a Tertiary Maar Structure Using Three-Dimensional Resistivity Imaging", 1999.*
Caldwell et al. "Instantaneous apparent resistivity tensor: a visualization scheme for LOTEM electric field measurements".*
Feynman, R.P. et al. (1963), *The Feyman Lectures on Physics, Mainly Mechanics, Radiation, and Heat*", Addison-Wesley Publishing Co., Inc., 8 pgs.
Kittel, C. et al. (1965), "mechanics, Berkeley physics course—vol. 1, Harmonic Oscillator", McGraw Hill Book Company, 4 pgs.
U.S. Appl. No. 09/656,191, filed Sep. 6, 2000, Srnka.
U.S. Appl. No. 10/798,248, filed Mar. 11, 2004, Srnka.
Alumbaugh, D. L. et al, (1997), "Three-Dimensional Massively Parallel Electromagnetic Inversion—II. Analysis of a Crosswell Electromagnetic Experiment", *Geophys. J. Int.* 128, pp. 355-363.
Alumbaugh, D. L. et al. (1998), "3D EM Imaging From a Single Borehole; A Numerical Feasibility Study", *SEG Annual Meeting Expanded Abstracts* 1, pp. 448-451.
Alumbaugh, D. L. et al. (1998), "Image Appraisal for 2D & 3D Electromagnetic Inversion", *SEG Annual Mtg. Expanded Abstracts* 1, pp. 456-459.
Buselli, G. et al. (1996), "Robust Statistical Methods for Reducing Sferics Noise Contaminating Transient Electromagnetic Measurements", *Geophysics* 61, pp. 1633-1646.
Caldwell, T.G. et al. (1998), "The Instantaneous Apparent Resistivity Tensor: A Visualization Scheme for LOTEM Electric Field Measurements", *Geophys. J. Int.* 135, pp. 817-834.
Chave, A.D. et al. (1990), "Some Comments on Seabed Propagation of ULF/ELF Electromagnetic Fields", *Radio Science* 25(5), pp. 825-836.
Cheesman, S. et al. (1987), "On the Theory of Sea-Floor Conductivity Mapping Using Transient Electromagnetic Systems", *Geophysics* 52(2), pp. 204-217.
Constable, S. et al. (1996), "Marine Controlled-Source Electromagnetic Sounding 2. The Pegasus Experiment", Mar. 1996, *J. Geophys. Res*., vol. 101, No. B3, pp. 5519-5530.
Dey, A. et al, (1975) "Electric Field Response of Two-Dimensional Inhomogeneities to Unipolar and Bipolar Electrode Configurations", *Geophysics* 40(4), pp. 630-640.
Edwards, R. N. (1997), "On the Resource Evaluation of Marine Gas Hydrate Deposits Using Sea-Floor Transient Electric Dipole-Dipole Methods", *Geophysics*, 62(1), pp. 63-74.
Egbert, G.D. (1997), "Robust Multiple-Station Magnetotelluric Data Processing", *Geophys. J. Int.* 130, pp. 475-496.
Eiedesmo, T. et al. (2002), "Remote Detection of Hydrocarbon Filled Layers Using Marine Controlled Source Electromagnetic Sounding", Z-99, *EAGE, 64$^{th}$ Conf.*, Florence, Italy, May 27-30, 2002, 4 pgs.
Ellingsrud, S. et al. (2002), "Remote Sensing of Hydrocarbon Layers by Seabed Logging (SBL): Results from a Cruise Offshore Angola", *The Leading Edge*, pp. 972-982.
de Hopp A.T. (1995), *Handbook of Radiation and Scattering of Waves*, Academic Press, ISBN 0-12-208655-4, to include Chapters 24, 25 & 26.
Eswarappa et al. (1989), "Mixed boundary semicircular and 120 degrees-sectoral microstrip antennas", *Iee Antennas & Prop. Soc. Int. Symp.*, pp. 1688-1690.
Feynman, R.P. et al. (1964), *The Feynman Lectures on Physics, The Electromagnetic Field*, Addison-Wesley Pub. Co., Library of Congress No. 63-20717, 3 pgs.
Flosadottir, A.H. et al. (1996), "Marine Controlled-Source Electroseismic Sounding, Modeling and Experimental Design," *J. Geophys. Res.* 101(B3), pp. 5507-5517.
Garg, N. et al. (1984), "Synthetic Electric Sounding Surveys Over Known Oil Fields", *Geophysics*, Nov. 1984, vol. 49, No. 11, pp. 1959-1967.
Greaves, R.J., et al. (1991), "New Dimensions in Geophysics for Reservoir Monitoring", *SPE Formation Evaluation*, pp. 141-150.
Gupta, R.N. et al. (1963), "Unipole Method of Electrical Profiling", *Geophysics* 28, pp. 608-616.
Hoversten, G.M. et al. (1992), "Seaborne Electromagnetic Sub-Salt Exploration", Abstracts, *American Geophysical Union*, p. 313.
Hoversten, G.M. et al. (1998), "Marine Magnetotellurics for Petroleum Exploration, Part II: Numerical Analysis of Subsalt Resolution", *Geophysics* 63, pp. 826-840.
Hoversten, G.M. et al, (1998), "Electromagnetics 2: Modeling for Petroleum and Mining Applications", *SEG Annual Meeting Expanded Abstracts* 1, pp. 425-428.
Jupp, D. et al. (1997), "Resolving Anisotrophy in Layered Media by Joint Inversion", *Geophys. Prospecting* 25, pp. 460-470.
Kaufman, A.A. et al. (1982), "Marine Electromagnetic Prospecting System", Apr. 1982, *Geophysics* 47, p. 431.
Kaufman, A.A. et al. (1983), "Frequency and Transient Soundings" pub. Elsevier, pp. 285-313.
LeLand (1991), "Estimation of boundary value processes applied to shape determination of a circular antenna from observations on the boundary", *IEEE Proc. 30$^{th}$ Cond. Decision & Control*, sections 4-5.
Li, X. et al. (1991), "Controlled source tensor magnetotellurics", *Geophysics* 56(9), pp. 1456-1461.
MacGregor, L. et al. (1998), "The RAMESSES Experiment—III. Controlled-Source Electromagnetic Sounding of the Reykjanes Ridge at 57 de. 45'N", *Geophys. J. Int.* 135, pp. 773-789.
MacGregor, L.M. et al. (2000), "Use of Marine Controlled-Source Electromagnetic Sounding for sub-Basalt Exploration", *Geophys. Prosp.* 48, pp. 1091-1106.
Maurer, H. et al, (1998) "Optimized and Robust Experimental Design: A Non-Linear Application to EM Sounding", *Geophysics J. Int.*, v. 132, pp. 458-468.
Magilatov, V.S. et al. (1996), "A New Method of Geoelectrical Prospecting by Vertical Electric Current Soundings", *J. Appl. Geophys.* 36, pp. 31-41.
Nekut, A.G. et al. (1989), "Petroleum Exploration Using Controlled-Source Electromagnetic Methods", *Proceedings IEEE* 77, pp. 338. 362.
Nabighian, M.N. (1988), "Electromagnetic Methods in Applied Geophyics", *SEG Investigations in Geophysics*, No. 3, vols. 1 & 2.
Newman, G.A. et al. (1997), "Three-Dimensional Massively Parallel Electromagnetic Inversion -I. Theory", Report SAND96-0582, Sandia Nat'l Labs, 1996 and *Geophys. J. Int.* 128, pp. 345-354.
Peters, L.J. et al. (1932), "Some Aspects of Electrical Prospecting Applied in Locating Oil Structures", *Early Geophysical Papers of the Society of Exploration Geophysicists* II, pp. 145-164.
Sinha, M. et al. (1997), "Evidence for Accumulated Melt Beneath the Slow-Spreading Mid-Atlantic Ridge", *Phil. Trans. R. Soc. Lond.* 355, pp. 233-253.
Smith, B.W. et al. (1984), "Wega-D System—A Cybernetic Exploration Method for Oil and Gas Prospecting", Wega-D Geophysical Research Ltd., 31 pgs.
Spies, B.R. (1989), "Depth of Investigation in Electromagnetic Sounding Methods", *Geophysics* 54, pp. 872-888.
Strack, K.M. (1992), "Exploration with Deep Transient Electromagnetics", Elsevier.
Tarkhov, A. G., (1957) "On Electric Geophysical Exploration Methods of a Pure Anomaly", *Bull. Acad. Sci. U.S.S.R., Geophys.* Ser., No. 8, pp. 11-22.
Verma, S. K. et al, (1995) "Focused Resolution of Thin Conducting Layers by Various Dipole EM Systems", *Geophysics*, v. 60, pp. 381-389.
Zhdanov, M.S. et al. (1994), "The Geoelectrical Methods in Geophysical Exploration", Elsevier.
Zhdanov, M. et al, (1995) "Resistivity Imaging by Time Domain Electromagnetic Migration (TDEMM)", *Exploration Geophysics*, v. 26, pp. 186-194.
Zhdanov, M. et al, (1996) "Three-Dimensional Quasi-Linear Electromagnetic Inversion", *Radio Science*, v. 31, pp. 741-754.

Zhdanov, M. et al, (1997) "Time-Domain Electromagnetic Migration in the Solution of Inverse Problems", *Geophys. J. Int.*, v. 131, pp. 293-309.

Zhdanov, M. et al, (1998) "Preconditioned Time Domain Electromagnetic Migration", *SEG Annual Meeting Expanded Abstracts*, v. 1, pp. 461-468.

Ciric, I.R. (2000), "New Model for the Computation of Quasi-Stationary Fields Due to Arbitrary Distributions of Magnetic Dipoles," *IEEE Transactions on Magnetics* 36(4), pp. 1990-1995.

Feynman, R.P. (1963), "*The Feynman* Lectures on Physics, Mainly Mechanics, Radiation, and Heat," Addison-Wesley Publishing Co., Inc., 8 pgs.

Kittel, C. et al. (1965), "mechanics, berkeley physics course—vol. 1, Harmonic Oscillator," McGraw Hill Book Co., 4 pgs.

Ciric, I. R., "New Model for the Computation of Quasi-Stationary Fields Due to Arbitrary Distributions of Magnetic", *Magnetics, IEEE Transactions On*, vol. 36, No. 4, pp. 1990-1995, Jul. 31, 2000.

* cited by examiner

METHOD OF IMAGING SUBSURFACE FORMATIONS USING A VIRTUAL SOURCE ARRAY

CROSS-REFERENCE TO RELATED APPLICATIONS

This application is a continuation of U.S. application Ser. No. 10/228,453, filed Aug. 27, 2002 now U.S. Pat. No. 7,769,572, which claims the benefit of U.S. Provisional Application No. 60/318,082 filed on Sep. 7, 2001, each of which is incorporated by reference, in its entirety, for all purposes.

FIELD OF THE INVENTION

This invention relates to the field of controlled-source electromagnetic surveys for geophysical applications. More specifically, this invention relates to a method of imaging subsurface formations using a virtual source array.

BACKGROUND OF THE INVENTION

Electromagnetic sources used in geophysical surveying generally produce unfocused regions of subsurface excitation. Unfocused excitations result both from the diffusive nature of low frequency electromagnetic wave propagation in the earth and from the use of relatively simple source configurations in the surveys. Unfocused excitations are a severe disadvantage when a target-oriented survey is needed, such as when it is desirable to probe the electrical properties of a prospective formation in a location where a complex geologic background may be present.

To eliminate the disadvantages of unfocused surveys, a method of source focusing is disclosed in U.S. patent application Ser. No. 09/656,191, filed Sep. 6, 2000 (hereinafter referred to as "Srnka"). The method, referred to as the remote reservoir resistivity mapping method ("R3M") uses a spatially extended grounded electromagnetic source array that is positioned on the earth's surface, or near the seafloor, to focus electromagnetic energy on the subsurface target. The source array consists of two concentric electrode rings whose radii are optimally determined from theoretical modeling to focus the subsurface excitation at the approximate depth of the subsurface target. A limitation of the Srnka method, however, is that for typical reservoir depths, which range from 500 meters to greater than 5000 meters, the total length of electrode wire that is required in the concentric electrode rings ranges from about 23.5 km to greater than 235 km.

These extreme lengths of electrode wire raise numerous operational challenges. For example, difficulties in handling and deploying the electrode wires, and problems in ensuring accurate positioning of the wires in the desired electrode ring locations may be involved, and there is the need to avoid obstacles in the area of the desired ring locations, and the requirement that the electrodes be uniformly grounded along their lengths. Other problems influence the economics of the survey, including the large cost of the electrode wire, some of which is likely to be damaged or lost in each survey, and the large labor and logistics costs associated with mobilization, demobilization, deployment, and recovery of the wire.

For these reasons, Srnka also disclosed an alternative method that reduces the required length of electrode wire by substituting a set of equally spaced radial electric bipoles, each having a length equal to the difference in the lengths of the radii of the two concentric rings. FIG. 1 depicts both the R3M concentric ring method and this radial bipole alternative. Concentric electrode rings 4 and 5 lie on surface 1 of earth 2 and have radii a and b, respectively, and a center 7 generally above reservoir 3. In the radial bipole alternative method these concentric rings are replaced by radial electrode bipole sources 6. Each bipole source 6 has a length $L=b-a$. Srnka discloses that a minimum of six radial bipole sources 6 is preferable. A signal equivalent to the signal that a receiver array would receive from the concentric ring source array is produced mathematically by summing the signals received by the receiver array from each of the bipole sources 6 (For convenience, FIG. 1 does not depict the location of the receiver array). This alternative method, which allows the simulation of a concentric ring source array, is referred to as the virtual concentric ring source method, or as the radial bipole method, and substantially reduces the required length of electrode wire as compared to the R3M physical concentric ring source method.

The virtual concentric ring source method nevertheless uses relatively long lengths of electrode wire and inherently retains many of the operational challenges of the R3M physical concentric ring source method. In addition, both methods have other inherent disadvantages, in particular for certain aspects of the subsurface resistivity-imaging problem. Specifically, both methods produce maximum responses near a pre-specified subsurface excitation focus depth (in other words, at the approximate depth of the target), but provide little differential sensitivity to features within an appreciable vertical range of that depth. More specifically, the ability to image separately features above or below the target a distance of less than five percent of the target's depth below the surface is limited. This limitation greatly hinders the imaging of stacked reservoirs. In addition, amplifier saturation effects can influence data quality and hinder analysis of such data. A third issue is that both methods produce primarily vertical subsurface currents in the region of the target. These currents are not adequate for imaging reservoir electrical macro-anisotropy (vertical electrical isotropy), such as exists in many reservoirs due to the presence of shale interbeds. Imaging this anisotropy is essential for estimating reservoir net and gross volumes, and for determining hydrocarbon pore volumes.

Accordingly, a method is desired which retains the advantageous electromagnetic responses of the R3M physical concentric ring source and radial bipole methods, but which reduces or eliminates the disadvantages of those methods. The present invention satisfies that desire.

SUMMARY

This invention relates generally to a method of simulating the signal of an electromagnetic source using one or more dipole sources. In the method a dipole source is located at an excitation location corresponding to a segment of the electromagnetic source to be simulated. The dipole source is activated, and an electromagnetic signal recorded at one or more receiver locations. This process is repeated for additional excitation locations corresponding to additional segments of the source being simulated. The data from the sequence of dipole source excitation locations is processed to determine the simulated signal of the electromagnetic source.

BRIEF DESCRIPTION OF THE DRAWINGS

The features of the present invention will become more apparent from the following description in which reference is made to the drawings appended hereto. Reference numbers that are used in more than one of the drawings refer to the same function in each drawing.

Changes and modifications in the specifically described embodiments can be carried out without departing from the scope of the invention, which is intended to be limited only by the scope of the appended claims.

DETAILED DESCRIPTION OF THE INVENTION

The present invention is a method of simulating the advantageous multicomponent electromagnetic response of a resistive reservoir to excitation by a concentric ring source array, or its radial bipole equivalent, with a significantly reduced amount of electrode wire. In a preferred embodiment, the method uses one or more short dipole sources, each located sequentially at source excitation locations corresponding to a location of a radial bipole to be simulated, to obtain measurement data during field surveys in the region of the subsurface target to be imaged. Phase and amplitude receiver data are synchronized with data from the source locations and summed using a Green's function integration to determine the response of the target. The method has an inherent ability to create a large number of virtual source configurations by varying the number and positions of the source excitation locations that are integrated in the receiver data, thereby facilitating much higher spatial resolution of the near surface, as well as for other depths, than can be attained by previously proposed methods. Additional virtual source configurations can be created by use of Green's function reciprocity conditions which can be used to relate electric field recordings made with exchanged transmitter and detector locations.

The present method allows for the recording of signals from a large number of linear electric sources. Integration of receiver data from these linear sources facilitates the imaging of subsurface resistivity outside of the region that would be the focal point of a concentric ring source array. This advantage allows for measurement of the subsurface horizontal resistivity response over a range of depths, and allows for detection of reservoir resistivity anisotropy. An advantage of the use of a multiplicity of sources is production of a multiplicity of electric current probes of the subsurface target, which can have positive effects on data redundancy.

Figure 1:
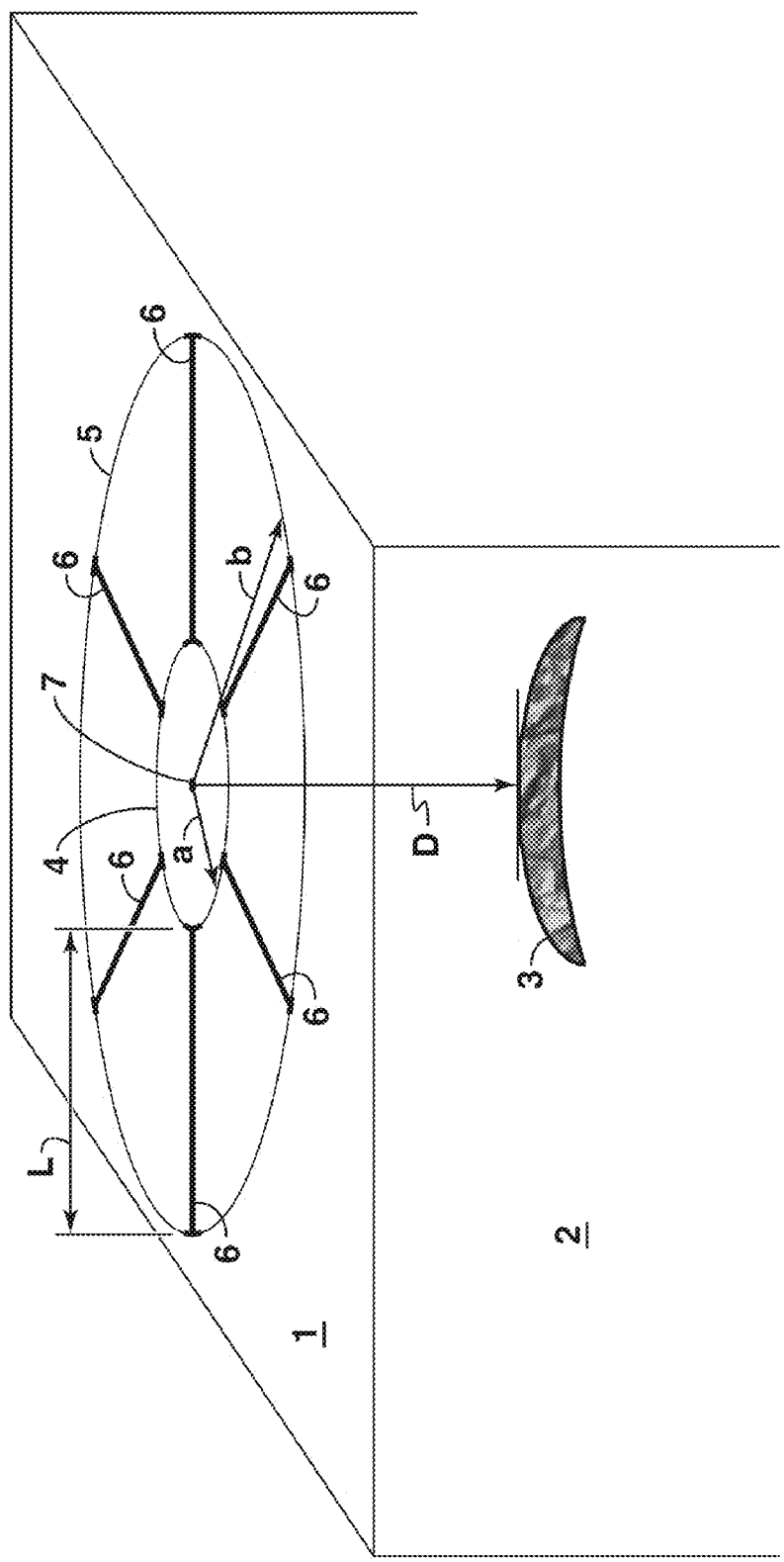
FIG. 1 depicts a perspective view of the Srnka method.

The method of the present invention can be more fully described with reference to the flow chart in FIG. 2 and the embodiment depicted in FIG. 3. The initial step, FIG. 2—step 100, requires calculation of the dimensions of the R3M method's concentric electrode rings for the subsurface target of interest. In FIG. 3, subsurface target 3 within earth 2 is at depth D below the earth's surface 1, and concentric electrode rings 4' and 5' have diameters a and b respectively. Rings 4' and 5' are not physical electrode rings, but rather are solely used in the calculations required in the present method (As used herein, the addition of a prime to a reference number indicates that the referenced item is part of a virtual source, i.e. a source to be simulated, as opposed to a physical source. For example, in the R3M method of FIG. 1, electrode rings 4 and 5 are physical sources, whereas in FIG. 3, electrode rings 4' and 5' are virtual sources). As specified in Srnka, to maximize source excitation at depth D it is preferable if $a/D=1.5$ and $b/a \geqq 9$. In addition, Srnka also discloses that a minimum ratio $b/a \geqq 4$ provides a sufficient source excitation at depth D.

Figure 2:
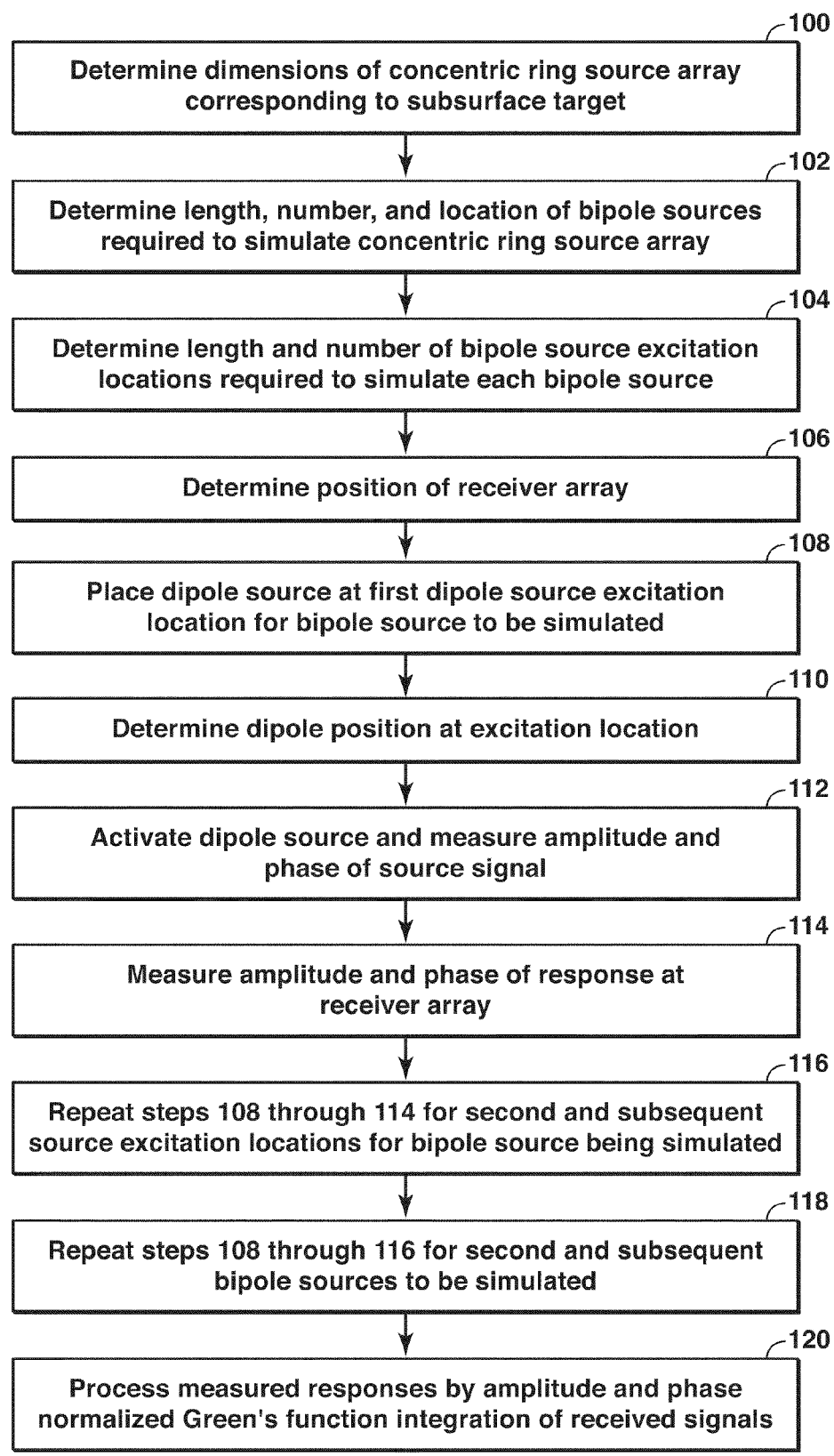
FIG. 2 is a flow chart of the steps for implementation of a first embodiment of the present invention.
Figure 3:
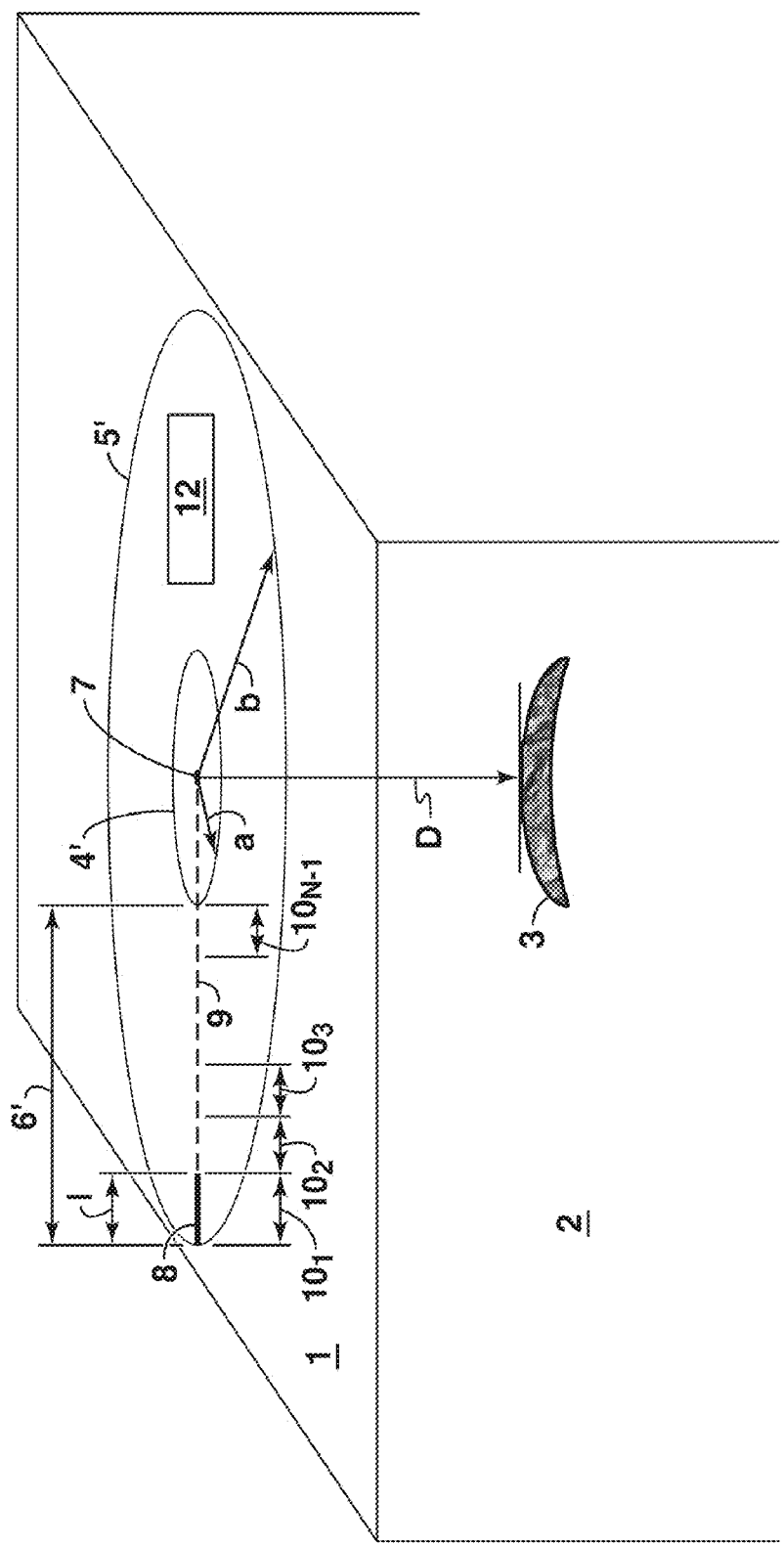
FIG. 3 depicts a perspective view of a first embodiment of the present invention.

Next, FIG. 2—step 102, the number, length L, and location of radial bipole sources for Srnka's virtual concentric ring source method must be determined Srnka discloses that a minimum of six bipole sources, each of length $L=b-a$, is preferred for the radial bipole method. As will be understood from Srnka, the use of these bipole sources provide a mechanism for creating an electromagnetic source focal point at the depth D of target 3. In Srnka, the radial bipole sources (e.g. the radial bipole sources 6 of FIG. 1) are physical sources. An objective of the present invention is to simulate these radial bipole sources using shorter physical sources, referred to as dipole sources, and to thereby simplify the acquisition of electromagnetic survey data. Thus, in the present method, FIG. 2—step 102 results in the calculation of the number, length and location of the radial bipole sources to be simulated. For simplicity, the location of only one simulated radial bipole source 6' is shown in FIG. 3.

In the method of the present invention, each radial bipole source of length L is replaced by N−1 shorter radial dipole sources of length $l=b/N$, FIG. 2—step 104. Length l is restricted to $l \leqq a$ so that the radius of the inner virtual concentric ring 4' is at least one radial dipole source length, for ease of data integration following the steps described below. For typical reservoir target depths D, which may range from 500 meters to 5000 meters subsurface, and for typical values of length l ranging for ease of deployment purposes from 100 meters to 1000 meters, the number N may range from about 3 to more than 300.

Next, FIG. 2—step 106, the position of receiver array 12 is determined. Factors to be considered in designing and determining a location for the receiver array, which will be understood to those skilled in the art, are further discussed in Srnka.

Next, FIG. 2—step 108, a first radial dipole source is placed at a first source excitation location corresponding to a first bipole source to be simulated. In FIG. 3, the first bipole source to be simulated is 6', and radial dipole source 8 of length l is placed at first source excitation location $10_1$ along a radius 9 of the virtual outer concentric ring 5'. In FIG. 3, first source excitation location $10_1$ extends from virtual outer concentric ring 5' along radius 9 inward toward center 7. The present method is not limited to this location of first source excitation location $10_1$. As noted in Srnka for the virtual concentric ring source method, radial dipole source 8 should be grounded at each end over a distance of at least ten percent of length l, and, as will be understood to those skilled in the art, should be powered by variable frequency (preferably $10^{-4}$-$10^4$ Hz), high current (preferably $10^2$-$10^6$ Amperes)

electrical power sources and controllers. Further details on sources for use in electromagnetic surveying are provided by Srnka.

Next, FIG. 2—step 110, the physical location of the radial dipole source 8 at the source excitation location $10_1$ must be determined. This location can be determined by geodetic or other methods well known to those skilled in the art. The required positioning accuracies for each end of the radial dipole source are preferably 1 meter on land and 5 to 10 meters offshore.

Next, FIG. 2—step 112, the radial dipole source is energized and the amplitude and phase of the source signal is recorded. The source signal at each source excitation location is preferably held constant, with variations in phase limited to 0.1 degree and in amplitude to 0.1%, as further described in Srnka.

In FIG. 2—step 114, the amplitude and phase of the response at the receiver array 12 are recorded.

The sequence encompassed by FIG. 2—steps 108 through 114 is repeated, FIG. 2—step 116, for a radial dipole source located at a second source excitation location. In FIG. 3, the second source excitation location is indicated as $10_2$. Thereafter, the process of steps 108 through 114 is repeated for additional source excitation locations $10_3, 10_4, \ldots 10_{N-1}$ until measurements have been recorded along the entire length of the radial bipole source 6' being simulated. In FIG. 3, this length corresponds to the portion of radius 9 extending from virtual electrode ring 5' to virtual electrode ring 4'. This process completes the source excitations and receiver response recordings necessary to simulate radial bipole source 6'.

The mathematical calculations of the present method require the normalizing of the multicomponent receiver responses to the source electric dipole signal (magnitude and phase) recorded for each source excitation location. Normalization assures that unwanted changes in receiver signals due to variations in either source coupling or power source current are removed from the receiver data. Source phase and amplitude control, as described above, together with recording of the source output with accuracies of 0.1 degree in phase and 0.1% in amplitude is preferred. Additional processing steps can include manipulation of the current in the transmitting electric dipole to achieve noise suppression and focusing effects. Manipulation of the dipole current can be achieved during data recording or by computational means after data is recorded.

The sequence encompassed by FIG. 2—steps 108 through 116 is then repeated, FIG. 2—step 118, for the second and each subsequent bipole source locations, as specified in FIG. 2—step 102 (the second and subsequent bipole sources to be simulated are not shown in FIG. 3). This process completes the recording of the data required in the present method to compute the response of target 3 in FIG. 3.

Finally, FIG. 2—step 120, the received signals for dipole source excitations corresponding to each bipole source are integrated in either the frequency or time domain using received signal amplitude and phase control relative to the source signal. This process is referred to as amplitude and phase normalized Green's function integration. Each integration constructs the signals that would have been recorded if physical radial bipole sources of length L=b−a and extending from virtual electrode ring 5' to virtual electrode ring 4' at each of the locations specified in FIG. 2—step 102 had been used as physical sources. The integration results in the creation of a virtual radial bipole source at each of the locations specified in FIG. 2—step 102. Upon completion of these integrations, the virtual concentric ring source method of Srnka can be applied to determine the characteristics of the target.

Figure 4:
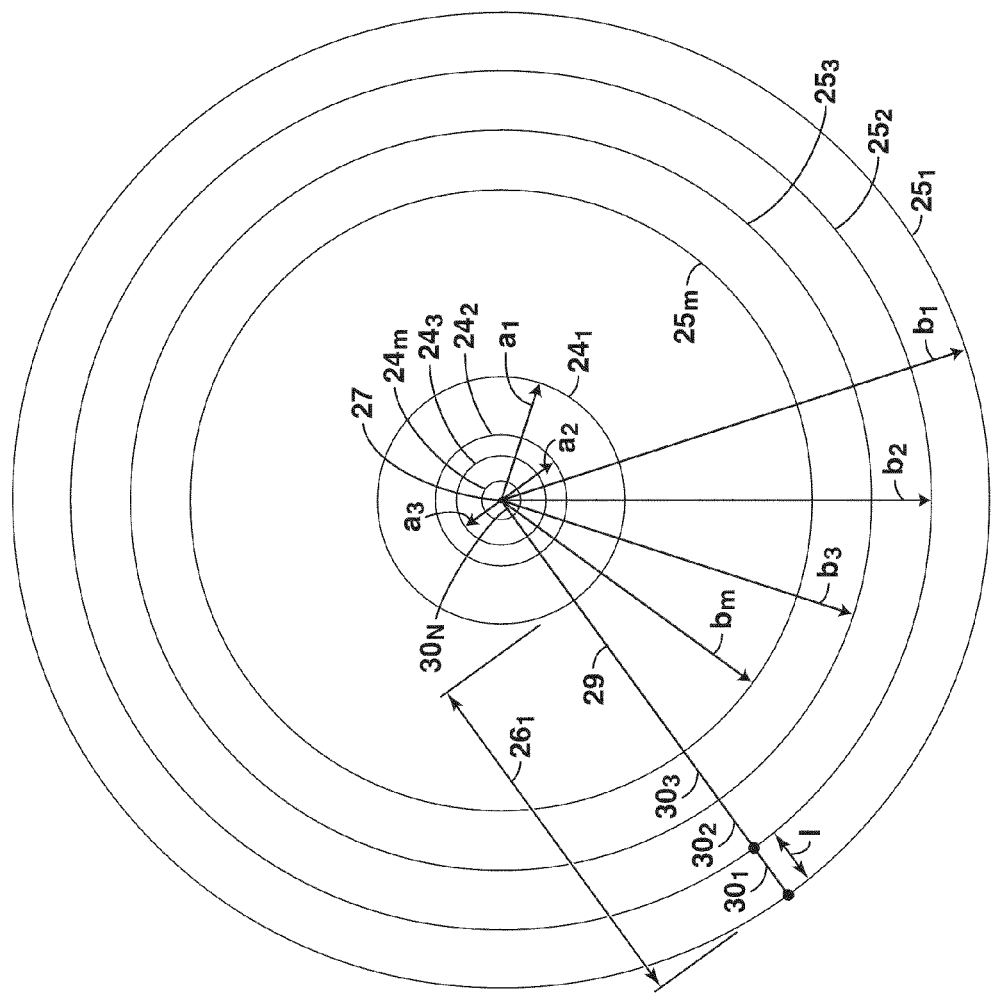
FIG. 4 depicts a plan view of a second embodiment of the present invention.

A second novel aspect of the present invention involves the ability to create a large number of virtual concentric ring source array configurations (in other words, to obtain simulated data for virtual concentric rings with a range of values of a and b). This advantage derives from the ability to vary the number and locations of source excitations that are summed in the receiver data, and allows accurate target characterizations over a broader range of depths than can be characterized by the R3M or virtual concentric ring source array methods. FIG. 4 demonstrates this aspect of the present invention.

FIG. 4 depicts a sequence of virtual outer concentric electrode rings $25_1, 25_2, 25_3, \ldots 25_m$, with diameters $b_1, b_2, b_3, \ldots b_m$, and a sequence of virtual inner concentric electrode rings $24_1, 24_2, 24_3, \ldots 24_m$, with diameters $a_1, a_2, a_3, \ldots a_m$. All rings are centered at 27. A first virtual bipole radial source to be simulated, extending from ring $24_1$ to ring $25_1$, is shown as $26_1$. Dipole source excitation locations $30_1, 30_2, 30_3, \ldots 30_N$ extend inward from ring $25_1$, along radius 29 toward center 27. (For convenience in discussing FIG. 4, the prime reference, which otherwise signifies the distinction between a virtual and a physical source, has been omitted).

The diameters $b_i$ and $a_i$ of virtual concentric electrode rings $25_i$ and $24_i$ and length l of the dipole sources to be used at each dipole source excitation location $30_i$ are determined as discussed above. Note that the constraint $1 \leq a$ noted above will determine the radius for the innermost, inner concentric electrode ring $24_m$. This constraint thereby establishes the total number of virtual concentric electrode rings in this embodiment of the present invention. Since N−1 radial dipole positions exist which exclude one electrode end at zero radius, (in other words, for which the constraint $1 \leq a$ is satisfied), it follows from the well-known binomial theorem of mathematics that ((N−1)!)/(2!(N−3)!) virtual ring source combinations exist. This will be understood to one skilled in the art. These virtual ring source combinations cover a range of aspect ratios of the radius of the virtual outer concentric ring to the radius of the virtual inner concentric ring (in other words, of the ratio $b_i/a_i$), including aspect ratios near unity that produce narrow (annular) and shallow subsurface excitations. As a result, a broad range of virtual bipole sources $26_i$ can be simulated, resulting in a characterization of the subsurface region over a much broader range of depths than has previously been possible. Note also that as will be known to one skilled in the art additional virtual source array configurations can be generated using Green's function symmetries.

For example, using $b_1$=10 km and l=500 m gives N=20, which allows for creating 19!/(2!17!)=171 virtual ring sources. The combinations of ring sources having radial aspect ratios $b/a \geq 4$ produce focused vertical electric field excitations that range by a factor of 5 over depth. For the b/a=4 case, the range of depths is from the near surface (D=333 m) to the deep subsurface (D=1.67 km)). As noted in Srnka, for each virtual concentric ring source so constructed, the radius of maximum vertical electric field excitation is approximately 2 a. Note also that the optimum frequency of excitation for each virtual ring increases as D decreases due to the skin depth effect, allowing much higher spatial resolution for the near surface, in other words small D, excitations.

The implementation of this embodiment follows directly from the discussion of FIGS. 2 and 3 above. Source and receiver data is recorded for each source excitation location extending along the entire length of radius 29. In contrast to the process of FIG. 3, these source excitation locations extend from outer concentric ring $25_1$ along radius 29 to the innermost inner concentric ring $24_m$. This data recording process continues for each radius 29 along which a virtual radial bipole source is to be simulated (only a first radius 29 is depicted in FIG. 4). As noted above, a minimum of six virtual bipole sources is preferred, separated by no more than 60 degrees.

The processing of data in this embodiment also follows from the discussion of FIGS. 2 and 3 above, except that the additional amount of data acquired in this embodiment adds additional processing steps. First, referring to FIG. 4, the data corresponding to source excitation locations for a virtual radial bipole source $26_1$, extending from outer concentric ring $25_1$ to inner concentric ring $24_1$, are processed. This processing step is repeated for each of the other virtual radial bipole sources that correspond to outer concentric ring $25_1$ and inner concentric ring $24_1$. Processing of the data corresponding to these virtual radial bipole sources allows characterization of the subsurface at a depth centered on $D_1$.

Next the data corresponding to source excitation locations for a virtual radial bipole source (not shown in FIG. 4) extending from outer concentric ring $25_2$ to inner concentric ring $24_2$ are processed. This processing step is repeated for each of the other virtual radial bipole sources that correspond to outer concentric ring $25_2$ and inner concentric ring $24_2$. Processing of the data corresponding to these virtual radial bipole sources allows characterization of the subsurface at a depth centered on $D_2$.

This data processing sequence is repeated for the source excitation locations that correspond to each additional pair of concentric rings $25_i$ and $24_i$, each pair of which facilitates the characterization of the subsurface at depth $D_i$. The characterizations corresponding to depths $D_i$ derive from the aspect ratio $b_i/a_i$ which correspond to the dimensions of the concentric ring pairs $25_i$ and $24_i$. As noted above, this ratio will generally be $b/a=4$. Additional processing of the data may be performed for other aspect ratios $b/a>4$ by creating additional pairs of concentric rings. In FIG. 4, for example, data may be processed for source excitation locations extending along radius 29 from ring $25_1$ to $24_2$, thereby creating a distinct virtual bipole to be simulated, and a distinct subsurface target depth. Therefore, in the present method, data can be acquired once over the areal region on the surface of the earth overlying the target of interest, with multiple processing sequences used to increase the ability to characterize the entire subsurface below that areal region.

Although one or more short dipole sources may be used, either simultaneously or sequentially in the present invention, a preferred embodiment for land-based surveys uses only one electromagnetic dipole source that is moved sequentially in a radial direction inward, outward, or in an alternating sequence in both directions. Use of only one dipole source reduces the total amount of source electrode wire from tens or hundreds of kilometers to only a few hundred meters, as is determined by the specified dipole length l. The dipole length l for land-based surveys is preferably 500-1000 meters, to minimize the number of necessary source locations, since deployment of grounded source dipoles on land is relatively difficult. This deployment difficulty is due primarily to the need to physically move the electrode wire across the surface of the land, and also due to the need to ground the electrode ends to the earth at each new position. In the land survey implementation, the source dipole occupies positions $30_1$, $30_2$, $30_3$, and so on corresponding to a first bipole source to be simulated (FIG. 4). The process is repeated for each bipole source to be simulated.

Figure 5:
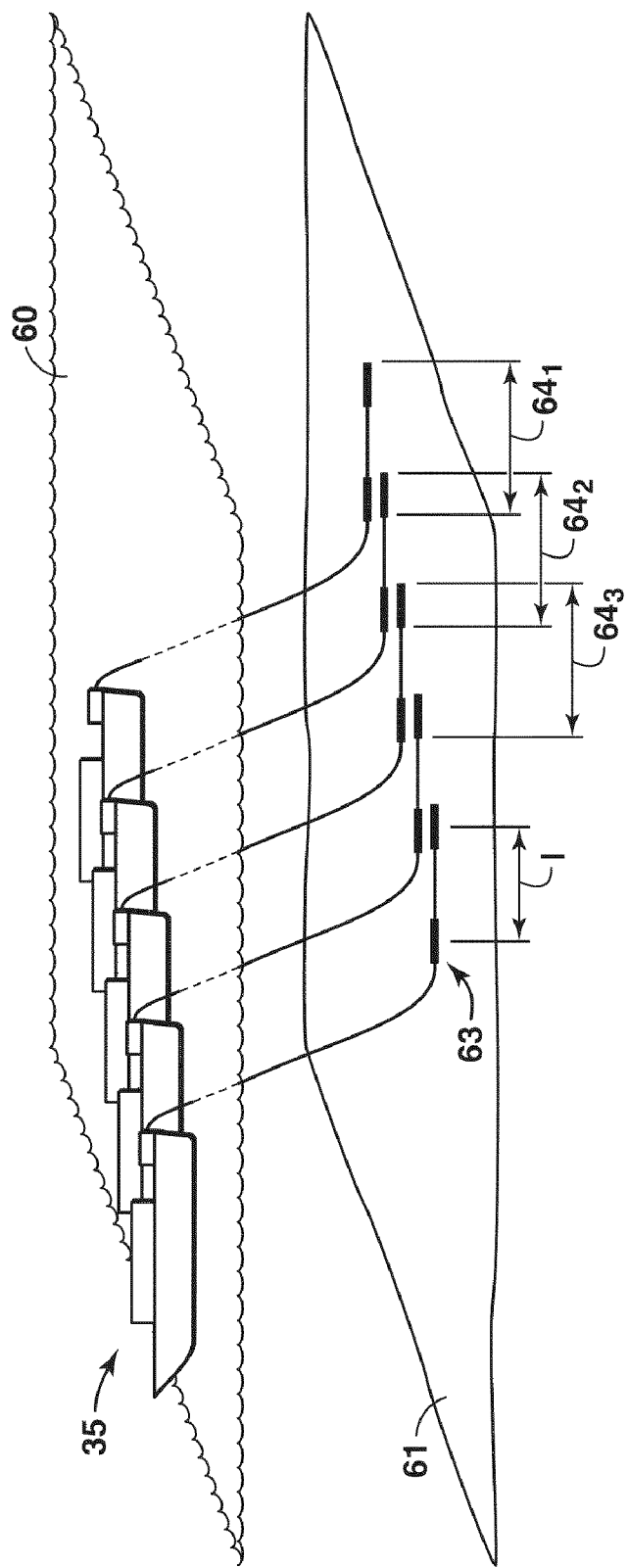
FIG. 5 depicts a data acquisition procedure for a marine application of an embodiment of the present invention.
Figure 6:
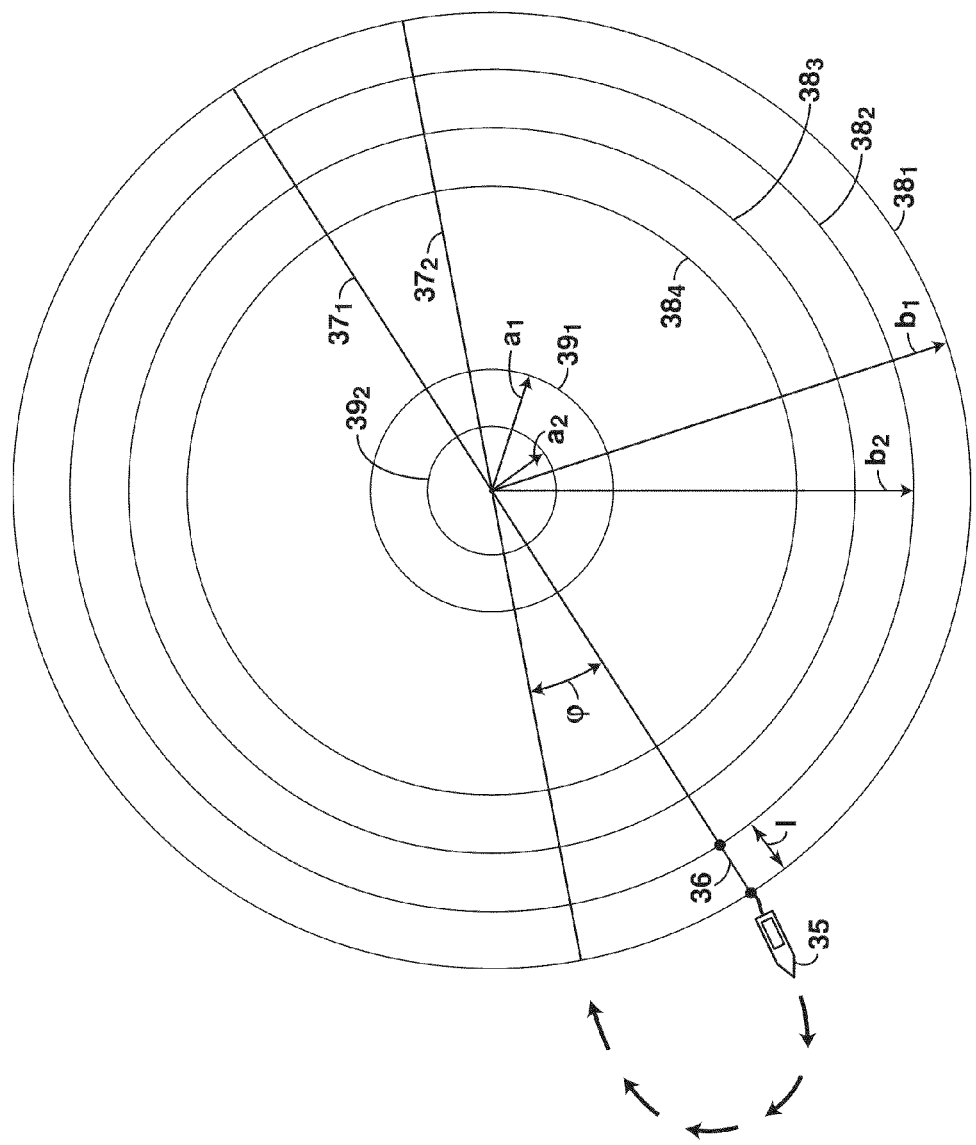
FIG. 6 depicts a plan view of a method for acquiring data for the marine application of FIG. 5.

FIGS. 5 and 6 show sequential source dipole movement in the marine case. The marine implementation of the present invention has advantages over the land-based survey implementation, including the ease of re-positioning the source dipole and the improved electrical coupling of the source electrodes to the seafloor and/or water so that the effort to ground the ends of the electrode is unnecessary. FIG. 5 shows a survey vessel 35 at the surface 60 of a body of water and an electric source dipole 63 at or near, but preferably within 50 meters of, the bottom 61 of the body of water, such as the seafloor. Source dipole 63 has a length l of typically 100-500 meters in the marine case, so as to minimize the difficulties of controlling the source remotely and accurately measuring its position from the survey vessel. The survey is carried out by the vessel either: 1) sequentially moving the source from a first source excitation location $64_1$ to a second source excitation location $64_2$, where sequential source excitation locations are centered at a distance separated by the length l of the source dipole, and then remaining stationary during the excitation of the source, with the process repeated for the source excitation locations required to simulate the bipole source of interest; or 2) continuously towing the dipole at low speed (typically 1 to 4 knots, approximately 0.5 to 2.0 meters/sec) while the source is under excitation. In the towed dipole source case, the source towing speed must be sufficiently slow so that distortion of the source excitation waveform due to the Doppler effect is negligible. In the case of diffusive electromagnetic waves in the earth, as are involved in this invention, the fractional change $\Delta f$ in source frequency f detected at a fixed electromagnetic receiver due to the Doppler effect is equal to the source speed $v_s$ divided by the phase velocity of the wave $v_p=3,162\times(\rho f)^{1/2}$, where $\rho$ is the average resistivity. For typical offshore basin electromagnetic survey values of $v_s=1$ meter/sec, $f=0.5$ Hertz, and $\rho=1\Omega$-m, $\Delta f=0.045\%$, which is negligible. This analysis will be well understood to those skilled in the art. As in the land case, the length of the virtual bipole thus formed is $N\times l$.

An additional important consideration in the continuously towed dipole case is minimization of the geometric smearing of the source position due to its speed $v_s$ during the transmission of one or more cycles of the source electrical current. This geometric effect must be minimized so that the receiver data integration using Green's function methods for a given source location is accurate. The fractional length $\Delta l/l$ that a source dipole of length l moves during M cycles of the emitted current at frequency f is given by $\Delta l/l=(M\times v_s)/(l\times f)$. Preferably, $\Delta l/l<<1$ so that excitations from only one source position are integrated into the receiver data. It is well known to practitioners of the art that M values, also referred to as data stacks, greater than one are usually required to achieve acceptable signal-to-noise values at the receivers. For typical offshore basin electromagnetic survey parameters, in other words l=100 meters, f=0.5 Hertz, and $v_s=1$ meter/sec, it is preferable if the data stack value $M<<50$. It is well known in the marine electromagnetic art that data stacks as small as M=5 can result in acceptable signal-to-noise values for receiver data, depending upon the environmental conditions in the survey area. Data stacks of M=20 or higher may be appropriate for deep targets and long transmitter to detector offsets. The effects of transmitter smearing can be mitigated by comparing measured results to models with smearing effects included.

A preferred method of acquiring data for the marine case is depicted in FIG. 6. Vessel 35 tows an electric dipole source 36 of length l along a first diameter $37\text{-}_1$ of virtual concentric ring $38_1$. Upon completion of data acquisition along the entire length of diameter $37_1$, vessel 35 turns and commences data acquisition along a second diameter $37\text{-}_2$, separated by angle φ from first diameter $37_1$. Repeating this process along a series of diameters $37_i$ (where the subscript i refers to each of the individual diameters along which data is to be acquired), preferably from 3 to 16, separated by equal angles φ, allows formation of a series of virtual concentric source rings of diameter ratios $b_i/a_i$, as described above. Model studies have shown that 3 to 16 equally spaced diameters are preferable to approximate concentric ring sources.

Figure 7:
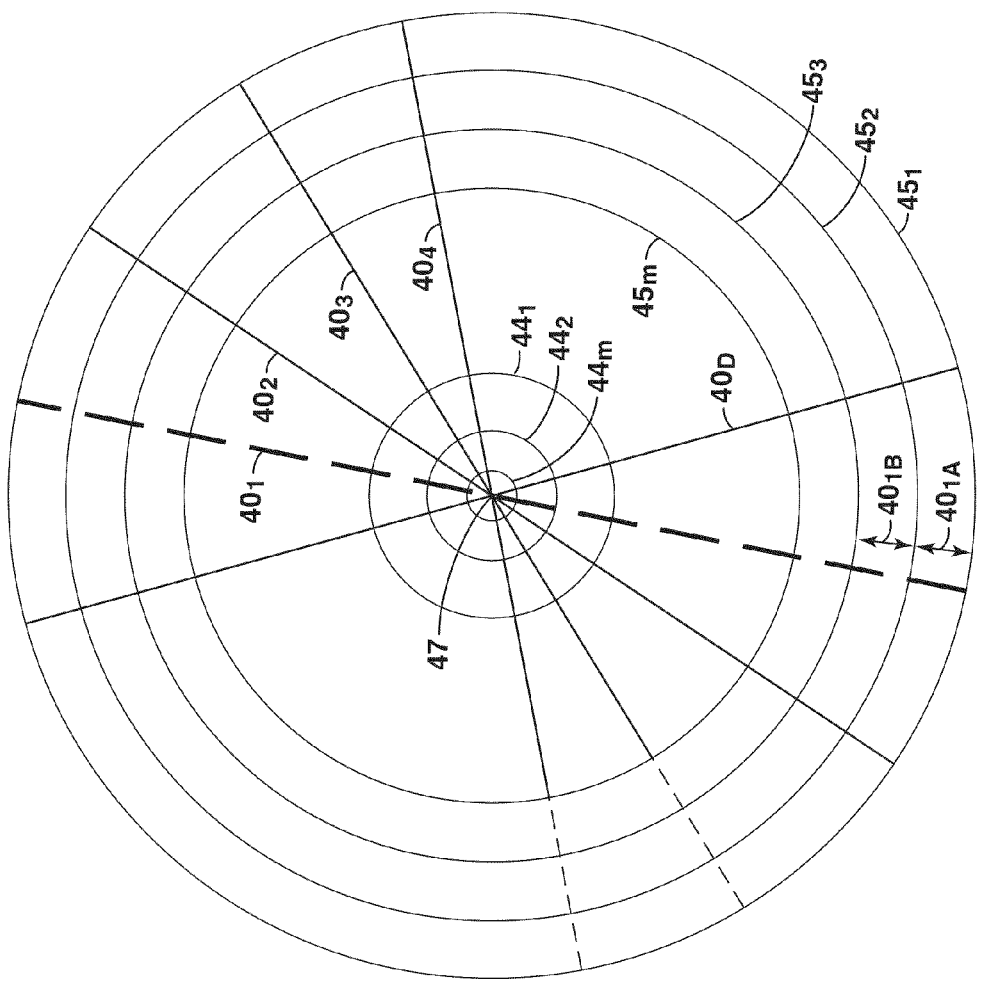
FIG. 7 depicts a plan view of an embodiment of the present invention in which variations in the locations of the target depth and focal point can be made.

In addition to simulating the source and receiver signals generated by concentric circular ring sources, the present method allows for the simulation of a large number of linear sources. These simulations derive from the integration of the data using other combinations of signals resulting from the excitations by the short dipoles, and thus can be carried out at no additional survey cost. This aspect of the invention allows for imaging of subsurface resistivity outside of the central focusing zones of the concentric ring sources, such as near the location of the outer concentric electrode ring which is simulated in the processing described above. For example, in FIG. 7, a set of full-diameter bipole sources $40_1, 40_2, \ldots 40_D$, corresponding to virtual concentric rings $44_1, 44_2, 44_M$ and $45_1, 45_2, \ldots 45_M$ are depicted. Each of these full-diameter bipole sources can be simulated using the method of the present invention, as described above. During the data acquisition phase of the present method, it is preferable that data are acquired between the innermost inner concentric ring $44_M$ and center 47. This preference results in source and receiver data recordings for the entire length of each full-diameter bipole source.

As noted above, data acquisition for the dipole source locations used to simulate each full-diameter bipole source produces significant vertical and horizontal electric field excitation over a range of depths extending to a depth approximately equal to the diameter of the outer concentric ring $45_1$, and centered symmetrically about center 47 of the concentric rings. In the method of the present embodiment, however, the dipole source excitation locations at a first end of the simulated bipole source may be excluded from the Green's function integration, thereby shifting the symmetry point from center 47 along the simulated bipole source in a direction away from the end at which the sources were excluded. This exclusion also reduces the effective depth of excitation, and allows for a different central focusing zone to be probed, in other words for a different subsurface region both in depth and in source focal point to be evaluated. For example, in a first processing sequence involving all data obtained for source excitation locations corresponding to full diameter $40_1$, the source focal point will be directly below the midpoint of diameter $40_1$, in other words directly below center 47. In a second processing sequence the data corresponding to dipole source excitation location $40_{1A}$ is excluded from the Green's function integration. This exclusion shifts the source focal point to a point which is nevertheless below diameter $40_1$, but which is shifted horizontally by the distance ½ away from location $40_{1A}$. A second exclusion of the data corresponding to dipole source excitation location $40_{1B}$ will shift the source focal point an additional distance of ½ in that direction. Each of these exclusions will also reduce the depth of the source focal point. Continued repetition of this process provides a method for developing a broader characterization of the subsurface. The horizontal electric field excitations resulting from exclusion of these individual dipole source locations in the integration, when combined with the primarily vertical excitation due to the virtual concentric ring sources, allows for detection of reservoir resistivity anisotropy, as discussed in Srnka.

Comparisons have been made of the numerical calculation of the electromagnetic response of the earth to excitation by a grounded linear bipole source (FIGS. 8 and 9) to the response calculated according to the present method using eight summed dipole sources (FIGS. 10 and 11), as further described in the following.

Figure 8:
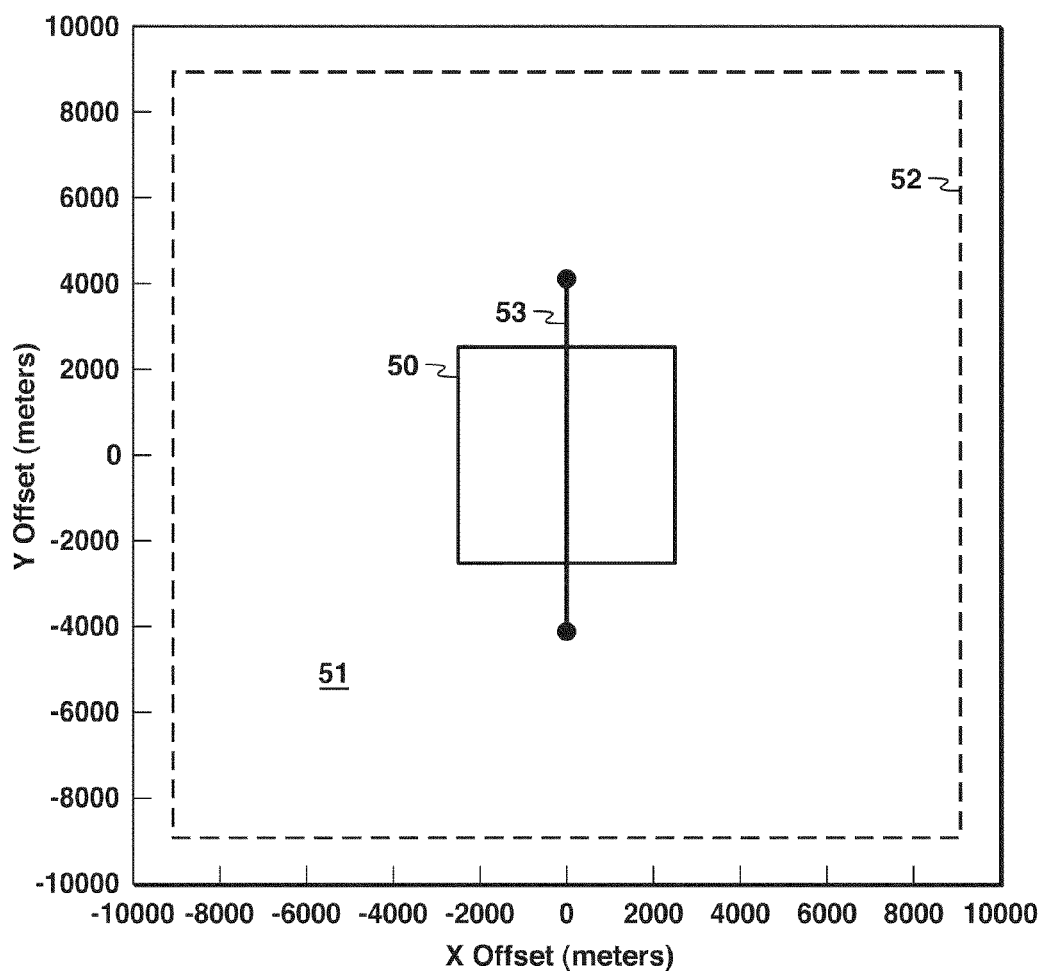
FIG. 8 depicts a model target for use with a bipole source processing example.
Figure 10:
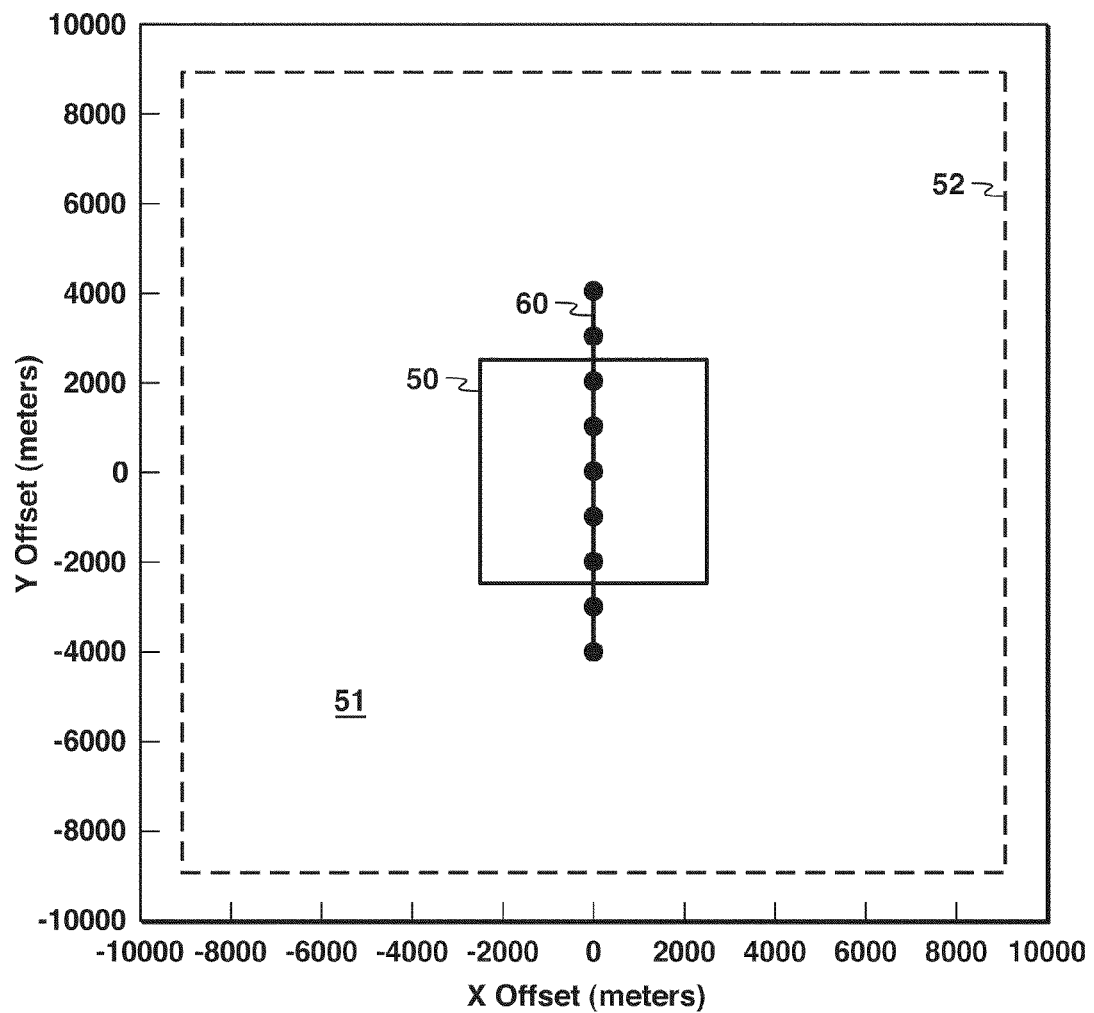
FIG. 10 depicts a model target for use with an embodiment of the present invention in which dipole sources are used to simulate the data acquired by the bipole source example of FIG. 8.

In both FIG. 8 and FIG. 10, a hypothetical model reservoir target 50 is a 5000 meter×5000 meter square slab 20 meters thick of 100 Ω-m (ohm-meter) resistive rock that is buried in a uniform background of 1 Ω-m conductive rock 51. The top of target 50 is buried 1000 meters below the seafloor, which in turn is covered by 1000 meters of uniform 0.25 Ω-m seawater. An insulating air layer 5000 meters high is placed above the seawater. In both figures a uniform grid of 5,329 electromagnetic receivers 52, spaced 250 meters apart in both horizontal (X and Y) directions, is placed at the seafloor, uniformly distributed within the coordinates $-9000 \leq Y \leq 9000$ and $-9000 \leq X \leq 9000$.

Figure 9:
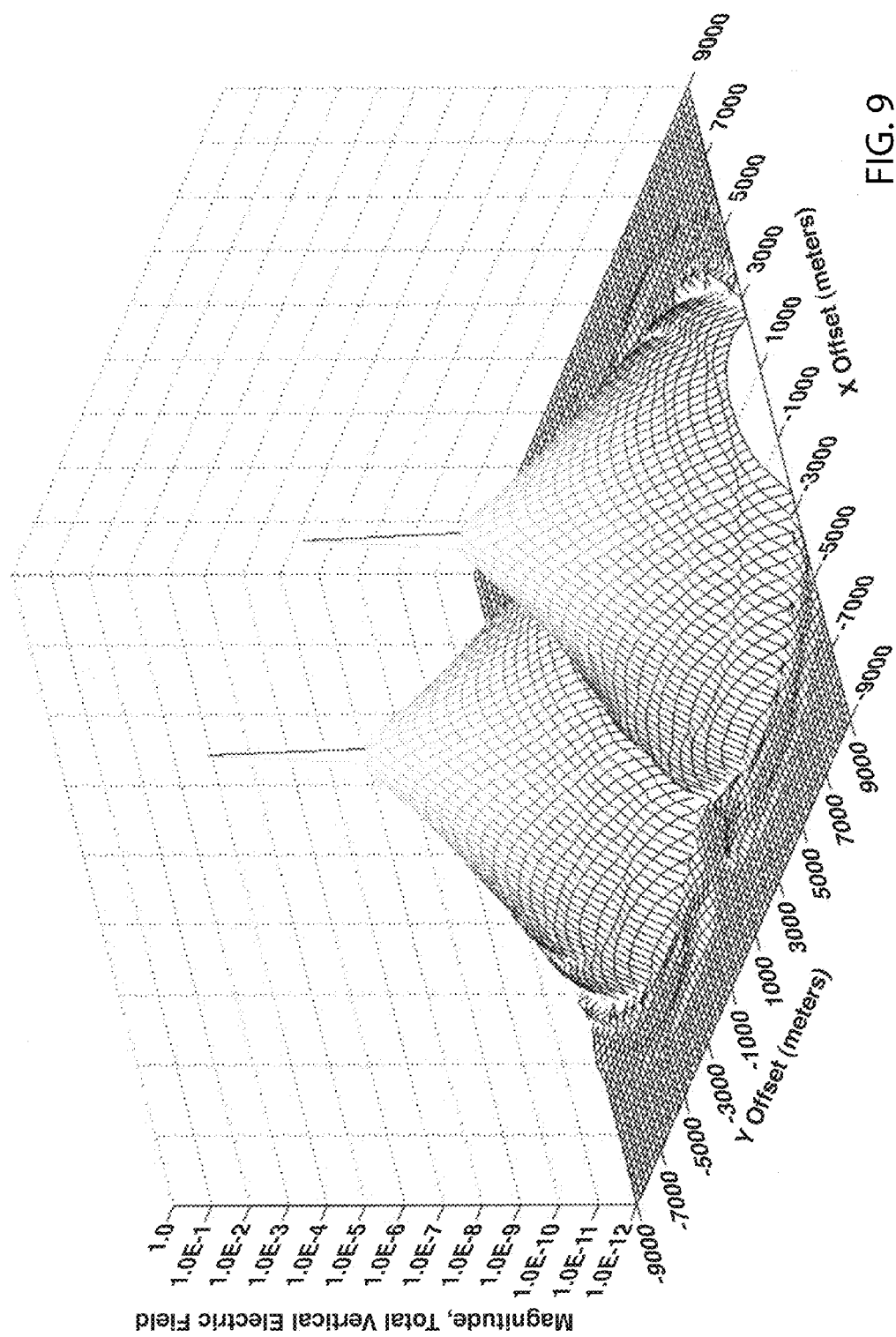
FIG. 9 depicts the total electric field calculated for the bipole source processing example of FIG. 8.

In FIG. 8 a single bipole 53 is placed along the Y-axis, centered at the coordinate origin (X=0, Y=0) and having length L=8000 meters. Bipole 53 is assumed to be placed in the seawater one meter above the seafloor and emits 100 Amperes of electrical current at a sinusoidal frequency of 1.0 Hertz. FIG. 9 shows the magnitude of the total vertical electric field in Volts/meter at the receiver positions, calculated at a frequency of 1.0 Hertz, for the single bipole model of FIG. 8. The response is smoothly varying in X and Y, except for large, mathematically infinite, values at the two ends of the bipole where current is injected. Persons skilled in the art will understand the source of these singularities in the numerical calculation procedure, and will further understand the decrease of the total vertical electric field with distance from source bipole 53.

Figure 11:
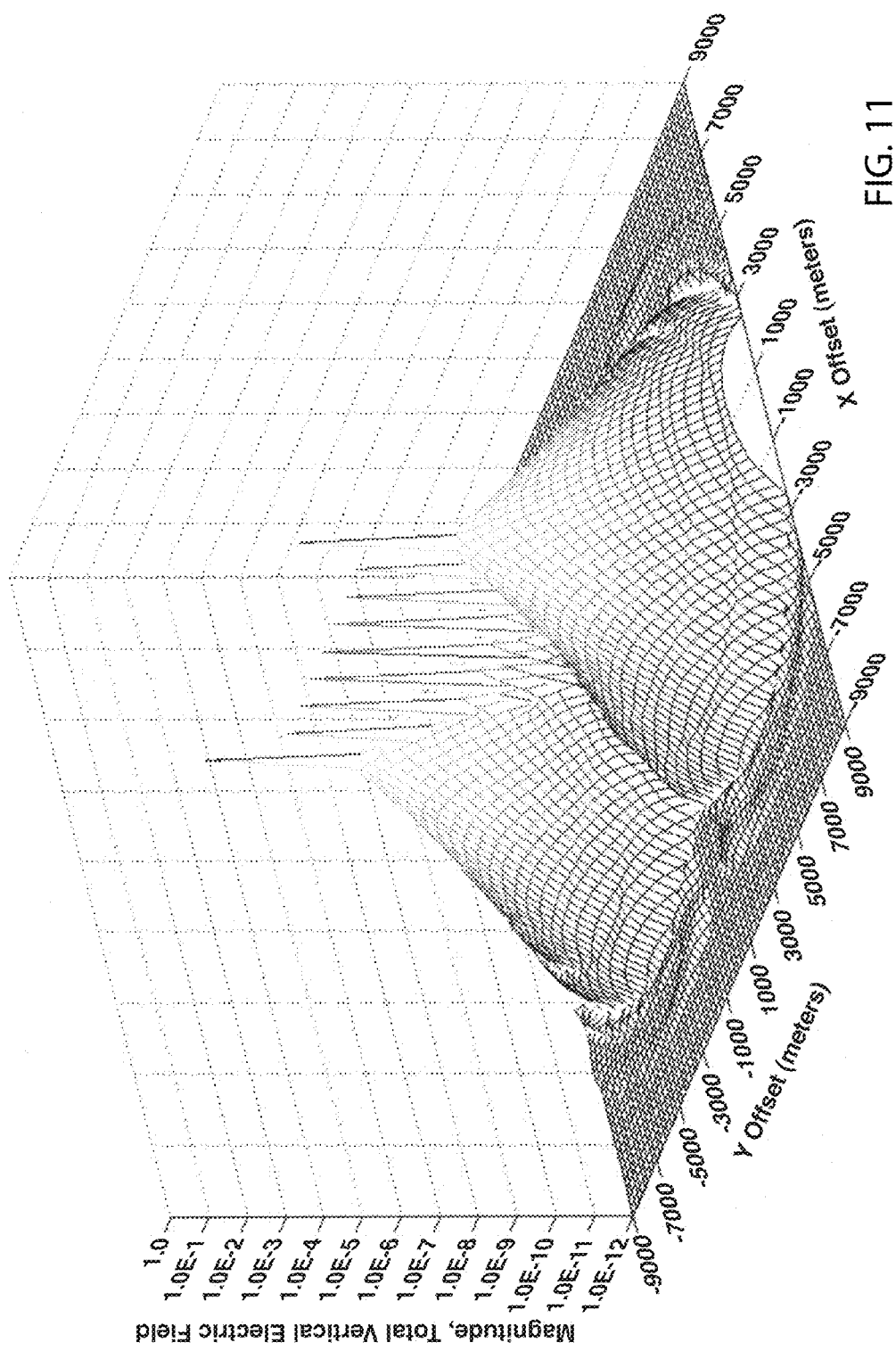
FIG. 11 depicts the total electric field calculated according to the embodiment of the present method depicted in FIG. 10.

In FIG. 10, the single 8000 meter electric bipole 53 of FIG. 8 has been replaced by eight grounded electric dipoles 60, each of length l=1000 meters and emitting 100 Amperes, so that the total electric dipole-moment (length times current) of the source is preserved. The ends of adjacent dipoles 60 are separated by one meter in the Y direction for more stable calculation in the numerical simulation (This separation is not depicted at the grid scale of this figure). In all other respects the model of FIG. 10 is identical to the model of FIG. 8. FIG. 11 shows the calculated response for the model of FIG. 10 using the present method, again at a frequency of 1.0 Hertz. The response in FIG. 10 is substantially identical to the response of FIG. 8, with differences limited only by the number of significant digits which are used in the numerical, i.e. Green's function, calculation. Note that due to the scale of the calculation grid, which has 100 meter horizontal cells, only a total of only nine singularity points are shown. At this calculation grid scale the singularities for the ends of adjacent dipoles 60 appear as a single singularity. As can be observed from comparison of FIG. 9 to FIG. 11, the results of these calculations illustrate the capability of the principle of grounded source superposition for electromagnetic arrays, as described in the present invention, to simulate the electromagnetic response that would be obtained from a full length electromagnetic bipole source.

FIG. 11 depicts the response calculated according to the present method for a model target of specified characteristics. Data processing techniques will be required to determine the resistivity and depth characteristics of a target for which data have been acquired according to the present method. These processing techniques generally involve one of two methods. Curve matching techniques, in which modeled responses, such as in FIG. 11, are compared to actual measured data to thereby infer the actual characteristics of the data acquisition target, are a first such method. A second method involves use of an imaging algorithm such as described by Srnka in which a wave equation based algorithm is used to invert the acquired data into a model that contains the characteristics of the target. These processing techniques, which will be well understood to those skilled in the art, are further discussed by Srnka.

It should be understood that the preceding is merely a detailed description of specific embodiments of this invention. Other embodiments may be employed and numerous changes to the disclosed embodiments may be made in accordance with the disclosure herein without departing from the spirit or scope of the present invention. Furthermore, each of the above embodiments is within the scope of the present invention. The preceding description, therefore, is not meant to limit the scope of the invention. Rather, the scope of the invention is to be determined only by the appended claims and their equivalents.

The invention claimed is:

1. A method of simulating the signal of a virtual electromagnetic source in conducting an electromagnetic survey, comprising the steps of:
   (a) selecting a configuration for a virtual electromagnetic source to be simulated, and calculating its dimensions;
   (b) locating a dipole source at a first excitation location, said first excitation location corresponding to a first segment of said virtual electromagnetic source;
   (c) energizing the dipole source;
   (d) measuring an electromagnetic signal at one or more receiver locations, wherein said one or more receivers and said dipole source are real items of electromagnetic surveying hardware;
   (e) repeating steps b, c and d for one or more additional excitation locations, each said additional excitation location corresponding to an additional, sequential segment of said virtual electromagnetic source; and
   (f) using a computer to combine the measured electromagnetic signals using the electromagnetic source superposition principle so as to simulate the signal of the virtual electromagnetic source.

2. The method of claim 1, wherein said segments cumulatively encompass substantially the entire length of said virtual electromagnetic source, and adjacent source excitation locations are centered at a distance separated by the dipole source's length.

3. The method of claim 1, wherein the virtual electromagnetic source to be simulated is a radial bipole source.

4. The method of claim 1, wherein the virtual electromagnetic source to be simulated is a concentric ring source.

5. The method of claim 4, wherein said concentric ring source is simulated from six or more simulated radial bipole sources.

6. The method of claim 1, wherein said simulation derives from a Green's function integration of the measured electromagnetic signals.

7. The method of claim 6, wherein said integration is performed in the time domain.

8. The method of claim 6, wherein said integration is performed in the frequency domain.

9. The method of claim 1, wherein the measured electromagnetic signals are normalized to a corresponding source signal.

10. A method of simulating the signal of a grounded concentric ring virtual source, comprising the steps of:
    (a) selecting a configuration for a grounded concentric ring virtual source to be simulated, and calculating its dimensions;
    (b) locating a dipole source at a first excitation location, said first excitation location corresponding to a first segment of a first radial bipole virtual source;
    (c) energizing the dipole source;
    (d) measuring an electromagnetic signal at one or more receiver locations, wherein said one or more receivers and said dipole source are real items of electromagnetic surveying hardware;
    (e) repeating steps b, c, and d for one or more additional excitation locations, each said additional excitation location corresponding to an additional segment of said first radial bipole virtual source;
    (f) using a computer to combine the measured electromagnetic signals using the electromagnetic source superposition principle so as to simulate the signal of said first radial bipole virtual source;
    (g) repeating steps b, c, d, e and f for at least five additional radial bipole virtual sources; and
    (h) using a computer to combine the simulated signals for the radial bipole virtual sources using the electromagnetic source superposition principle so as to simulate the signal of said grounded concentric ring virtual source.

11. A method of varying the central focusing zone of a linear bipole virtual electromagnetic source, comprising the steps of:
    (a) selecting a configuration for a linear bipole virtual source to be simulated, and calculating its dimensions
    (b) using a dipole source at sequential locations along substantially the entire length of the linear bipole virtual source to acquire electromagnetic data to simulate said linear bipole virtual source, said simulation using the electromagnetic source superposition principle to combine receiver responses from the sequential dipole source locations, wherein all receivers and said dipole source are real items of electromagnetic surveying hardware;
    (c) using a first combination of said data to image on a computer the subsurface for a first central focusing zone, and
    (d) repeating step (c) one or more times for different combinations of said data to image the subsurface for additional central focusing zones.

12. A method for generating and recording electromagnetic signals from a dipole source that can be combined to simulate the signal from a larger virtual electromagnetic source electrode, said larger virtual electromagnetic source electrode being of larger dimensions than said dipole source, comprising the steps of:
    (a) selecting a configuration for a larger virtual electromagnetic source electrode to be simulated, and calculating its dimensions;
    (b) locating the dipole source at a first excitation location corresponding to a first segment of said larger virtual electromagnetic source electrode;
    (c) energizing the dipole source and measuring an electromagnetic signal at one or more receiver locations, wherein said one or more receivers and said dipole source are real items of electromagnetic surveying hardware; and
    (d) repeating steps (b) and (c) for one or more additional excitation locations, each said additional excitation location corresponding to an additional sequential contiguous segment of the larger virtual electromagnetic source electrode.

13. The method of claim 12, wherein said segments cumulatively encompass substantially the entire length of said larger virtual electromagnetic source electrode, and adjacent source excitation locations are centered at a distance separated by the dipole source's length.

14. The method of claim 12, wherein the larger virtual electromagnetic source has a plurality of electrodes, and steps (b)-(d) are performed for each electrode.

15. A data-processing method for simulating the signal of a virtual electromagnetic source having one or more electrodes, said method comprising the steps of:
  (a) selecting a configuration for a virtual electromagnetic source to be simulated and calculating the dimensions of its virtual electrodes;
  (b) obtaining electromagnetic data resulting from successively locating and energizing a dipole source at a plurality of excitation locations corresponding to contiguous segments of each said virtual electrode, and measuring and recording electromagnetic response signals at one or more receiver locations, said dipole source having smaller dimensions than said virtual electrodes, wherein said one or more receivers and said dipole source are real items of electromagnetic surveying hardware; and
  (c) using a computer to combine the measured and recorded electromagnetic signals using the electromagnetic source superposition principle so as to simulate the signal of the virtual electromagnetic source.

16. The method of claim 15, wherein said segments cumulatively encompass substantially the entire length of said one or more virtual electromagnetic source electrodes, and adjacent source excitation locations are centered at a distance separated by the dipole source's length.

17. The method of claim 15, wherein said simulation derives from a Green's function integration of the measured electromagnetic signals.

18. A method of imaging the subsurface by varying the central focusing zone of a linear bipole virtual source, comprising the steps of:
  (a) selecting a configuration for a linear bipole virtual source to be simulated, and calculating its dimensions;
  (b) obtaining electromagnetic data from a subsurface region simulating a response from said linear bipole virtual source by locating and energizing a real dipole source sequentially along substantially the entire length of the linear bipole virtual source;
  (c) using a first combination of said data on a computer to image the subsurface for a central focusing zone; and
  (d) repeating step (c) one or more times for different combinations of said data to image the subsurface for additional central focusing zones.

19. The method of claim 1, wherein the dipole source is energized at a frequency $\geq 10^{-4}$ Hz.

* * * * *